United States Patent

Rocca et al.

Patent Number: 6,001,037
Date of Patent: Dec. 14, 1999

[54] TENSIONING DEVICE FOR BELTS, IN PARTICULAR TOOTHED BELTS

[75] Inventors: Carlo Rocca, Torino; Paolo Cascionale, Pescara, both of Italy

[73] Assignee: Dayco Europe S.P.A., Vallecupa, Italy

[21] Appl. No.: 08/993,171

[22] Filed: Dec. 18, 1997

[30] Foreign Application Priority Data

Dec. 19, 1996 [IT] Italy ................. TO960258 U

[51] Int. Cl.$^6$ .................. F16H 7/10; F16H 7/12; F16H 7/20
[52] U.S. Cl. .............. 474/112; 474/135; 474/199
[58] Field of Search ..................... 474/112, 119, 474/135, 165, 199

[56] References Cited

U.S. PATENT DOCUMENTS

| | | | |
|---|---|---|---|
| 4,966,572 | 10/1990 | Kunkel et al. | 474/199 |
| 5,222,918 | 6/1993 | Abe et al. | |
| 5,256,112 | 10/1993 | Thomey et al. | 474/112 |
| 5,421,788 | 6/1995 | Toth | 474/199 |
| 5,558,587 | 9/1996 | Church | 474/112 |
| 5,620,385 | 4/1997 | Cascionale et al. | 474/112 |
| 5,759,125 | 6/1998 | Berg | 474/112 |
| 5,820,503 | 10/1998 | Bruchner et al. | 474/112 |

FOREIGN PATENT DOCUMENTS

| | | |
|---|---|---|
| 0578556 | 1/1994 | European Pat. Off. |
| 2613795 | 10/1988 | France . |
| 4223325 | 10/1993 | Germany . |
| 4304829 | 8/1994 | Germany . |

*Primary Examiner*—Tamara L. Graysay
*Assistant Examiner*—Matthew A. Kaness
*Attorney, Agent, or Firm*—Stevens, Davis, Miller & Mosher, L.L.P.

[57] ABSTRACT

The tensioning device comprises a support plate attached to a pivot defining a fixed axis; an intermediate tubular element accommodating the pivot and able to rotate about the fixed axis; a pulley for a belt and supported by the tubular element, surrounding the pivot and able to rotate about an axis of rotation which is not coincident with the fixed axis; and an elastic element interposed between the pivot and the intermediate tubular element so as to urge elastically the intermediate tubular element against the belt. To ensure a high degree of perpendicularity between the pivot and the support plate and, therefore, accurate engagement between the tensioning device and the belt, the support plate and the pivot are integrally formed.

5 Claims, 1 Drawing Sheet

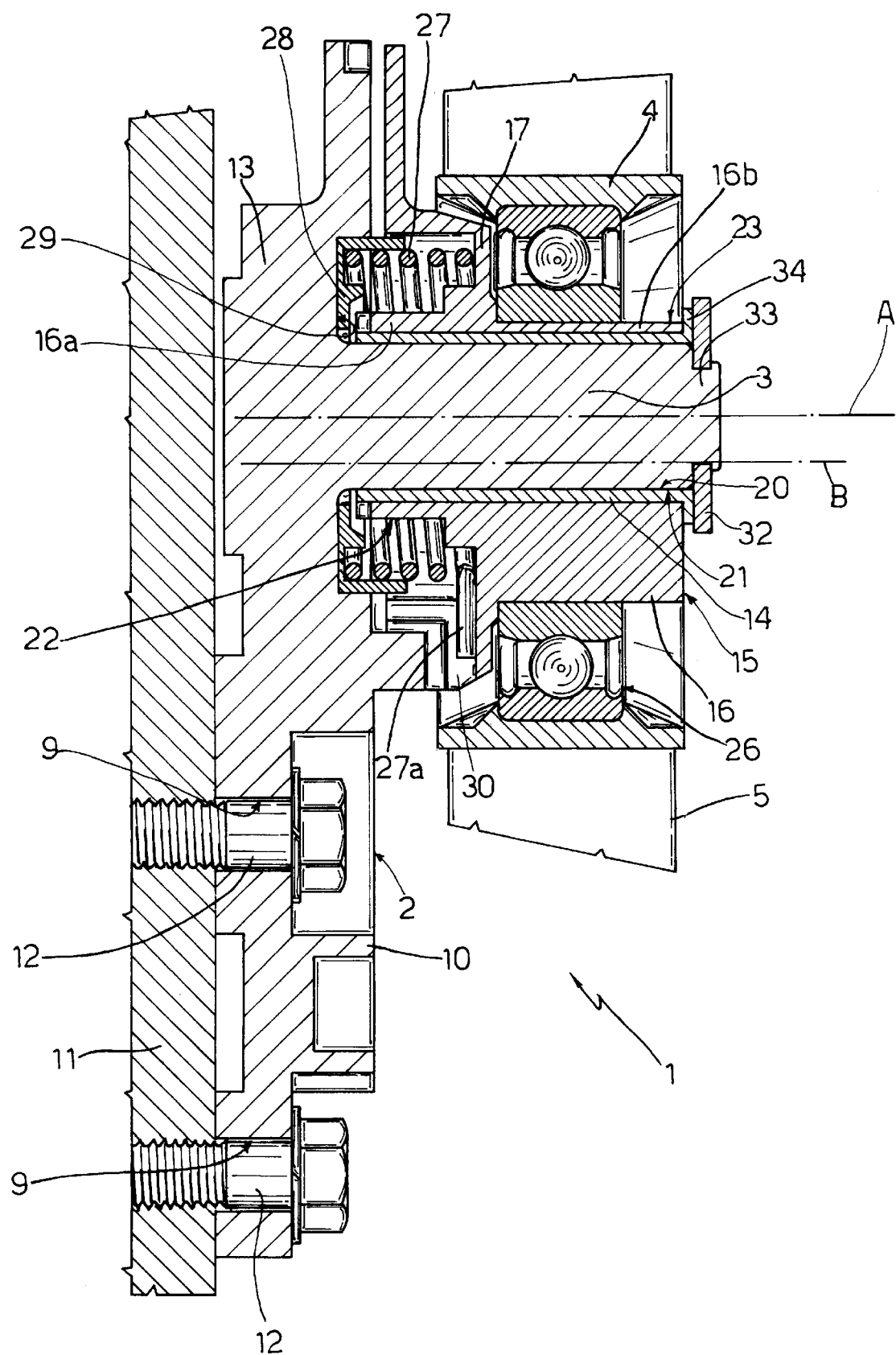

TENSIONING DEVICE FOR BELTS, IN PARTICULAR TOOTHED BELTS

BACKGROUND OF THE INVENTION

The present invention relates to a tensioning device for belts, in particular toothed belts for transmitting motion from the crankshaft to the camshaft of an internal-combustion engine.

It is known that a tensioning device is intended to ensure a substantially constant tension of a belt as the thermal and wear conditions vary. For this purpose, such a device comprises a pulley mounted to rotate eccentrically about a mounting pivot and loaded elastically in the direction of the belt.

Currently a mounting pivot for a pulley is made from steel and is fitted into a support plate which, in turn, is secured to a fixed wall (for example, to a wall of an engine block). This solution not only necessitates substantial outlay on the mounting of the pivot but also has the disadvantage of not always ensuring perfect perpendicularity of the pivot with respect to the associated support plate. This lack of perpendicularity has a particularly detrimental effect if the tensioner pivot is disposed projecting from the support plate, or if the support plate is secured to the respective fixed wall in a position which is not coaxial with respect to the pivot. In fact, in this case the error at the pivot is amplified by possible geometrical imperfections in the support plate caused by the high lever arm prevailing between the fastening point of the plate and the pivot. Consequently, the pivot assumes an effective position which is displaced to a not inconsiderable extent with respect to the nominal position and generates nonuniform forces along the section of the belt, as a result of which the belt, which is not retained transversely, can slip with respect to the pulley and lose contact therewith.

SUMMARY OF THE INVENTION

The object of the present invention is to devise a belt tensioner which is not affected by the above-mentioned problem.

According to the present invention there is provided a tensioning device for a belt, in particular a toothed belt, comprising a support plate attached to a pivot defining a first axis; an intermediate tubular element accommodating said pivot and able to rotate about said first axis; a pulley supported by said tubular element, surrounding said pivot and able to rotate about a second axis which is not coincident with said first axis; and an elastic element interposed between said pivot and said intermediate tubular element so as to urge elastically said intermediate tubular element against said belt, wherein said support plate and said pivot are formed in one piece.

BRIEF DESCRIPTION OF THE DRAWING

With a view to a better understanding of the present invention a preferred embodiment will now be described non-restrictively by way of example with reference to the accompanying drawing, the single FIGURE of which shows a cross-section through the present tensioner.

DETAILED DESCRIPTION OF THE INVENTION

Referring to the single FIGURE, the tensioning device, generally designated 1, comprises an aluminum support plate 2, integrally with which is formed a mounting pivot 3 supporting eccentrically a pulley 4 for a toothed belt 5.

In detail, the support plate 2 comprises a locating end 10 having holes 9 and fastened, by means of bolts 12 engaging in the holes 9, to a wall 11, for example of the engine block, and a projecting portion 13 extending in continuation of the fastening end 10 and integrally supporting the pivot 3. A self-lubricating bush 14 is disposed around the pivot 3 and defines an axis A, said bush preferably being made of steel and having an internal coating of plastic material. The bush 14 has an inner surface 20 in contact with the an outer surface 21 of the pivot 3 and defining therewith a coupling with a predetermined coefficient of friction.

An intermediate element 15, which is preferably of aluminum and is rotatable about the axis A, is fitted around the bush 14. The intermediate element 15 comprises a tubular portion 16 and a flanged portion 17 extending radially outwards from an intermediate region of the tubular portion 16. The tubular portion 16 is formed by a first section 16a extending from the flanged portion 17 towards the projecting portion 13 and by a second section 16b of non-uniform thickness, extending from the flanged portion 17 in the opposite direction to the preceding one. The first section 16a of the tubular portion 16 has a cylindrical outer surface 22 which is coaxial to the bush 14; the second section 16b has a cylindrical outer surface 23 which is eccentric with respect to bush 14 and which defines an axis B parallel to the axis A.

The outer surface 23 of the second section 16b supports a pulley 4 with the interposition of a ball bearing 26; therefore, the bearing 26 and the pulley 4 annularly surround the pivot 3 and are coaxial to the axis B and eccentric with respect to the axis A.

A helical spring 27, under torsional loading, is wound externally around the first section 16a of the tubular portion 16, bounded axially between the flanged portion 17 and a cap 28 accommodated in an annular recess 29 formed in the projecting portion 13 of the support plate 2 at the base of the pivot 3; additionally, the spring 27 has ends clamped against the flanged portion 17 and against the projecting portion 13, only one end being shown in the drawing, indicated at 27a, abutting against a transverse wall 30 of the flanged portion 17.

A metal washer 32 engages one end 33 of the pivot 3 and bears against an annular edge 34 of the bush 14, which edge is turned outwards; therefore, this end is upset so as to lock the bush 14 axially and the intermediate element 15 in position.

The mode of operation of the tensioner described above is as follows. The spring 27 is preloaded so as to press the assembly formed by the intermediate element 15, the bearing 26 and the pulley 4 against the belt 5, so as to ensure a preset tensioning of said belt. Therefore, in a manner known per se, when the tension on the belt 5 undergoes variation, the force of the spring 27 induces a rotation of the assembly 15, 26, 4 about the bush 14 and the pivot 3 (or about the axis A), thus inducing displacement of the axis of rotation B of the pulley 5, as a result of the eccentricity of the outer surface 22 of the intermediate element 15, into a new position corresponding to a new condition of equilibrium between the force of the spring and the resistance of the belt.

In a manner known per se and not described in detail, the friction present between the bush 14 and the pivot 3, at the surfaces 20, 21, ensures the damping of any oscillations derived from the force exerted by the belt and, therefore, from the variation in the position of the axis B; the bearing 26 assures instead the free rotation of the pulley 4 about the axis B during the movement of the belt 5.

The advantages which can be achieved with the tensioning device described above are the following: The integral formation of the support plate 2 and of the pivot 3 ensures a high degree of perpendicularity between them and thus obviates substantial positioning errors of the pivot 3 itself, even in the case described of the pivot 3 formed on the projecting portion of the plate 2. Moreover, this design incurs reduced production costs, since suitable machinery is not required for effecting the interference fit of the pivot.

The fact that the pivot 3 is formed from the same material, specifically aluminum, and is integral with the support plate 2 ensures improved heat dispersion over the entire plate and, therefore, over a wider region that in the known solution with a steel pivot; furthermore, the thermal expansion of the aluminum pivot 3 can be exploited so as to simplify the assembly operations of the bush 14. In fact, the pivot and the bush can be designed so as to have, when installed, a relatively high degree of mutual play which is taken up successively during the operation of the tensioner as a result of the differential thermal expansion between them, so as to ensure the desired degree of operational play. This possibility simplifies the assembly operations, insofar as the relatively high degree of play between the bush 14 and pivot 3 during the installation stage eliminates the danger of possible damage to the bush itself in the installation stage.

Finally, it is evident that the tensioning device described and illustrated here can be subject to modifications and variations without thereby departing from the scope of protection of the present invention. In particular, the fact is emphasized that the parts can be of such dimensions that damping of the friction between the bush 14 and the intermediate element 15 is obtained, instead of or as well as between the facing surfaces 20, 21 of the bush 14 and the pivot 3.

We claim:

1. A tensioning device (1) for a belt (5), comprising a support plate (2) attached to a pivot (3) defining a first axis (A); an intermediate tubular element (15) accommodating said pivot (3) and able to rotate about said first axis; a pulley (4) supported by said tubular element (15), surrounding said pivot (3) and able to rotate about a second axis (B) which is not coincident with said first axis (A); and an elastic element (27) interposed between said pivot (3) and said intermediate tubular element (15) so as to urge elastically said intermediate tubular element (15) against said belt (5), wherein said support plate (2) and said pivot (3) are integrally formed and said support plate (2) and said pivot (3) are made of aluminum.

2. A device according to claim 1, wherein said intermediate tubular element (15) has a cylindrical outer surface (23) coaxial to said second axis (B), bearing(26) being interposed between said outer surface (23) of said intermediate tubular element (15) and said pulley (4).

3. A device according to claim 1, characterised by comprising a cylindrical bush (14) interposed between said pivot (3) and said intermediate tubular element (15), said bush (14) having an inner surface (21) co-operating frictionally with an outer surface (20) of said pivot (3).

4. A device according to claim 1, wherein said plate (2) has a fastening portion (10) having a fastener (9) and a projecting portion (13) extending from said fastening portion, said projecting portion (13) supporting said pivot (3) spaced apart from said fastener (9).

5. A device according to claim 1, wherein said device is a tensioning device for a toothed belt.

* * * * *